March 11, 1958  A. W. NELSON  2,826,321
DUMP TRUCK
Filed Jan. 21, 1955

ARTHUR W. NELSON
*INVENTOR.*

BY Abraham Friedman
Atty.

United States Patent Office 2,826,321
Patented Mar. 11, 1958

2,826,321
DUMP TRUCK
Arthur W. Nelson, Brooklyn, N. Y.

Application January 21, 1955, Serial No. 483,327

7 Claims. (Cl. 214—510)

This invention relates to an improved means for emptying the storage compartment of a dump-type refuse collecting truck.

In the conventional dump truck used in refuse collection, the load is removed from the storage compartment by automatically operated mechanisms which open the tailgate and pivot the storage compartment to a position sufficiently inclined, to the horizontal to cause the refuse to slide out of the compartment. Since the refuse is generally tightly compacted the degree of inclination required to empty the compartment is substantial. Frequently mere compartment inclination is insufficient to cause refuse removal and additional means must be resorted to initiate the outward flow of refuse.

Consequently as a solution to this problem, it is the primary inventive object to provide a dump-type refuse truck which will positively expel refuse from the storage compartment at an accelerated rate involving a minimum tilting movement of the storage compartment thereby reducing the cost of the truck body tilting equipment and the time required to remove a load of refuse.

A further object of this invention is the provision of a dump truck which is provided with additional means for augmenting the force of gravity to remove a load from the storage compartment when inclined.

A still further object of this invention is the provision of an automatically controlled tilting storage compartment pivotally mounted on the chassis of a truck wherein the compartment is provided with mechanisms which open the tailgate and simultaneously positively urge the load out of the compartment through the open end, whereby the degree of inclination and time required to remove the load is reduced to a minimum.

Figure 1:
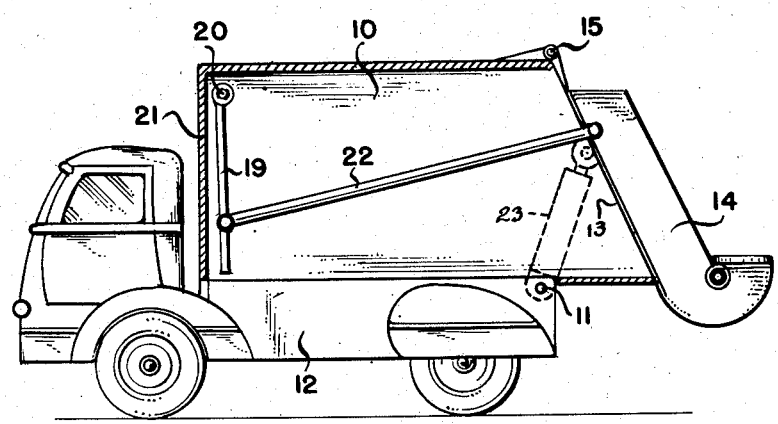
Figure 2:
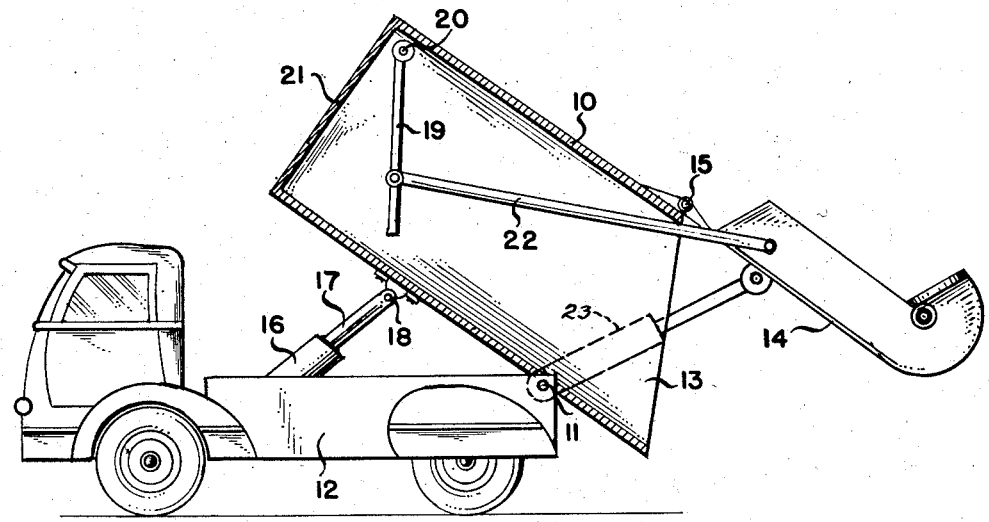

Further objects and inventive details will become more apparent from the following detailed description and claims when read in conjunction with the attached drawings in which:

Figure 1 is a side elevation of a refuse truck incorporating the invention showing the storage compartment in section in the loaded condition prior to dumping; and Figure 2 is a similar view showing the compartment in the dumping position.

As seen in Figure 1 the improved dump truck comprises a storage compartment 10 mounted pivotally at 11 to a chassis 12. The compartment 10 is sealed at the rear or outer end 13 by an inclined hopper loading tailgate 14, of conventional construction, pivoted at 15 to the top wall of the compartment.

The compartment 10 is rotated to the inclined dumping position of Figure 2 by a remotely controlled hydraulically actuated hoist 16 mounted on the chassis 12 and including a reciprocating piston 17 pivotally secured at 18 to the underside of the compartment 10. The tailgate 14 is pivoted outwardly to the open position about the pivot 15 by the usual remotely controlled hydraulic means.

Thus far the structure cited is of a conventional nature well known in the art. The conventional hydraulic apparatus for actuating the hoist 16 and the tailgate hopper 14 is not shown since the specific form of such apparatus is not relevant to the novelty of the invention herein involved.

The improvement involved in the instant invention comprises a refuse expelling plate 19 pivotally mounted within the compartment at 20 adjacent the inner end 21. The plate 19 is rotated about 20 by a link 22 pivotally secured at one end to the plate and at the other end to the tailgate 14. Thus when the tailgate 14 pivots to the position shown in Figure 2, the plate 19 rotates counterclockwise forcing the load in the compartment outwardly towards the open rear end 13. The conventional apparatus (not shown) for causing the opening movement of the tailgate 14 can be operated at any position of the compartment 10 relative to the chassis 12.

The refuse stored in the compartment is ordinarily in a highly compacted condition. Thus, only if the compartment is steeply inclined will the force of gravity alone cause the refuse to be expelled. However, due to the action of the plate 19, the load is both agitated and forced towards the open end 13 resulting in an accelerated removal of the refuse from the compartment. Moreover, removal can be effected at inclinations substantially less than required by a compartment not equipped with an expelling plate 19. Consequently, in addition to accelerating the dumping operation, the required size, operation, maintenance and cost of the lifting hoist 16 are all reduced.

In operation the tailgate 14 is rotated about the pivot 15 by the actuation of remotely controlled means such as, for example, hydraulic ram 23. Rotational movement of the hopper 14 to the open position of Figure 2 displaces the link 22 which in turn causes rotational movement of the plate 19 towards the depressed open end 13. The compacted material adjacent the plate 19 is agitated and forced towards the open end 13 providing the entire refuse load with an initial outflow movement.

The piston 17 is actuated by remotely controlled means (not shown) to rotate the compartment 10 about the pivot 11 to a fixed inclined position. Having assumed a degree of inclination consistent with the minimum requirements for expelling the refuse, the inclination of the compartment introduces a gravitational force component which further causes the outward flow of refuse. Having expelled the load the tailgate 14 and the lifting hoist 16 are returned to their initial positions by actuating the remotely controlled hydraulic means (not shown).

Although the remotely controlled means for actuating the lifting hoist and the tailgate hopper have been described as "hydraulic," it is apparent that the substitution of other conventional means therefore, would not be a departure from the inventive scope herein involved. Moreover, although the novel apparatus herein disclosed for accelerating the removal of material from the storage compartment of a dump truck is especially useful in connection with refuse trucks the apparatus is generally useful in connection with dump trucks used to transport other materials such as foods, earth, cement, etc.

Since the design requirements for the hoist 16 have been minimized by the introduction of the refuse expelling plate 19, it is apparent that the cost of fabrication has been correspondingly reduced.

Although a preferred embodiment has been disclosed, it should be understood that numerous changes, modifications, and substitutions can be made without departing from the scope of the invention.

Having thus described in detail the nature of the invention, the grant of Letters Patent is desired for the invention as defined by the following claims:

1. A dump truck comprising a chassis with a normally horizontal storage compartment pivotally mounted on the chassis and rotatable to fixed inclined positions, the said compartment comprising a closed inner end and an outer end spaced from the inner end including a gate pivotally mounted at the outer end and pivotable from an open position to a closed position, in combination with a plate pivotally mounted within the compartment adjacent the inner end, the said plate being rotatable from an initial position remote from the outer end to a terminal position closer to the outer end, whereby material within the compartment is forced towards the open end, in further combination with means connecting operatively the plate and the gate whereby gate movement imparts a corresponding plate movement, in still further combination with means for remotely controlling the gate movement, in still further combination with remotely controlled means for rotating the chassis to the fixed inclined positions.

2. A dump truck as in claim 1 wherein the first said means comprise a link pivotally connected at one end to the plate and at the other end to the gate.

3. A dump truck as in claim 1 wherein the gate is pivotally mounted at the outer end, whereby the gate movement is rotational.

4. A dump truck comprising a chassis with a storage compartment having a closed inner end and an outer end, the said outer end including a gate pivotable from a closed to an open position, in combination with a plate pivotally mounted within the compartment adjacent the inner end, said plate being connected to the gate with means responsive to pivotal movement of the gate whereby opening movement of the gate causes the plate to move towards the gate and closing movement of the gate causes the plate to move away from the gate, in still further combination with means for controlling the gate movement, the first said means comprising a linkage connected at one end to the plate and at the other end to the gate, and the second said means comprising a remotely controlled actuator operatively connected to the gate whereby actuation of the gate causes the corresponding plate movement.

5. A dump truck comprising a chassis with a storage compartment having a closed inner end and an outer end, the said outer end including a gate pivotable from a closed position to an open position, in combination with a plate pivotally mounted within the compartment adjacent the inner end, said plate being connected to the gate with means responsive to pivotal movement of the gate whereby opening movement of the gate causes the plate to move towards the gate and closing movement of the gate causes the plate to move away from the gate, in still further combination with means for controlling the gate movement, said gate and said plate being pivotally secured to the compartment and the first said means comprising a link pivotally connected to the gate at one end and the plate at the other end, said link connection being spaced from the center of rotation of the plate and the gate whereby gate movement is transmitted to the plate through the said link.

6. A dump truck comprising a chassis with a storage compartment pivotally secured to the chassis including a closed inner end and an outer end, said outer end including a gate pivotable from a normally closed position to an open position, in combination with means operatively connected to the gate for causing pivotal movement of the gate and in combination with a plate pivotally mounted within the compartment, whereby pivotal movement of the plate forces material within the compartment towards the outer end, in further combination with means for controlling the pivotal movement of plate, the last said means being responsive to the first said means, whereby plate movement is responsive to gate movement.

7. A dump truck comprising a chassis with a storage compartment pivotally secured to the chassis including a closed inner end and an outer end, said outer end including a gate pivotable from a normally closed position to an open position, in combination with remotely controlled means operatively connected to the gate for causing pivotal movement of the gate and in combination with a plate pivotally mounted within the compartment, whereby pivotal movement of the plate forces material within the compartment towards the outer end, in further combination with means for controlling the pivotal movement of the plate, and means for moving the compartment to a plurality of fixed inclined positions.

References Cited in the file of this patent

UNITED STATES PATENTS

| | | |
|---|---|---|
| 1,485,631 | Shea | Mar. 4, 1924 |
| 2,339,360 | Sicard | Jan. 18, 1944 |
| 2,460,403 | Teague | Feb. 1, 1949 |
| 2,570,244 | Jones | Oct. 9, 1951 |

FOREIGN PATENTS

| | | |
|---|---|---|
| 684,710 | France | Mar. 24, 1930 |